United States Patent

Bakx

Patent Number: 5,173,598
Date of Patent: Dec. 22, 1992

[54] OPTICAL SCANNING BEAM POSITION CONTROL SYSTEM WHICH IS FREE OF MODULATION BY TRACKING ERROR

[75] Inventor: Johannes Bakx, Eindhoven, Netherlands

[73] Assignee: U.S. Philips Corporation, New York, N.Y.

[21] Appl. No.: 733,926

[22] Filed: Jul. 22, 1991

[30] Foreign Application Priority Data

May 10, 1991 [EP] European Pat. Off. ........... 91201139

[51] Int. Cl.⁵ .............................................. G11B 7/00
[52] U.S. Cl. ................................ 250/202; 369/44.41; 250/201.5
[58] Field of Search .................... 250/202, 201.5; 369/44.32, 44.37, 44.41, 44.42, 44.38, 112

[56] References Cited

U.S. PATENT DOCUMENTS

| | | | |
|---|---|---|---|
| 4,340,950 | 7/1982 | Kosaka | 250/202 |
| 4,462,095 | 7/1984 | Chen | 369/44.38 |
| 4,750,162 | 6/1988 | Tajima | 369/46 |
| 4,787,076 | 11/1988 | Deguchi et al. | 369/44.37 |
| 4,893,298 | 1/1990 | Pasman et al. | 369/275.4 |
| 5,066,138 | 11/1991 | Toide et al. | 369/112 |

FOREIGN PATENT DOCUMENTS 0201603 11/1986 European Pat. Off.
63-9034 1/1988 Japan ................ 369/44.41

*Primary Examiner*—Constantine Hannaher
*Assistant Examiner*—James Beyer
*Attorney, Agent, or Firm*—Leroy Eason

[57] ABSTRACT

Apparatus for scanning tracks in an information plane of a record carrier by means of three beams. The radiation from each one of the three beam spots is push-pull detected by one of three split detection systems (10, 11, 12). A position signal Ep which is a measure of the position of an adjustable element (9) in the apparatus, which element determines the transverse positions of the spots with respect to the track being scanned, is derived from the detector signals. In response to the position signal a control circuit 33 corrects the position of the element (9). A normalizing signal, by which the position signal Ep can be made independent of the intensity of the beams, can also be derived from the detector signals.

8 Claims, 3 Drawing Sheets

OPTICAL SCANNING BEAM POSITION CONTROL SYSTEM WHICH IS FREE OF MODULATION BY TRACKING ERROR

BACKGROUND OF THE INVENTION

1. Field of the Invention

The invention relates to a device for optically scanning an information plane having tracks, which device comprises an optical system for generating two tracking beams and one main beam, a lens system for focusing the three beams on the record carrier to two tracking spots located at both sides of a track to be scanned and to one main spot on said track, and at least three detection systems for receiving radiation of respectively the two tracking beams and the main beam from the information plan, each detection system being split into at least two detectors. This device can be used in apparatus for writing and reading information on optical record carriers.

2. Description of the Related Art

A scanning device of this type is known from published European Patent Application No. 0,201,603. In the known device a tracking servosystem keeps the main spot on the track to be scanned. This system is controlled by means of a tracking error signal which is derived from the signals of the split detectors. A coarse control and a fine control can be used in the tracking servosystem. The coarse control is realised by moving a slide incorporating the scanning head into the transversal direction, i.e. the radial direction with respect to a round record carrier. The fine control can be realised by displacing an objective lens within the scanning head in the transversal direction. Due to such a displacement of the objective lens the radiation spots formed by the beams in the plane of the detectors will shift with respect to the associated detectors so that an offset is created in the tracking error signal with which the tracking servosystem is controlled.

The aforesaid European Patent Application describes a combination of detector signals producing a tracking error signal which is independent of small transversal displacements of the lens. However, in the case of larger displacements there are serious aberrations in the light path because the lens is used far outside its optical axis. Such displacements occur, for example, at the start of a searching action when the speed of the scanning head is considerably increased so as to proceed to another track on the record carrier. In such a situation the signals supplied by the detectors are often distorted seriously so that errors occur when counting the number of tracks passed during the searching action.

SUMMARY OF THE INVENTION

The present invention has for its object to obviate this drawback and provides an optical scanning device in which the influence of the position of the objective lens or another adjustable element incorporated in the light path on the tracking error signal is decreased. This scanning device is characterized in that the device comprises an element for adjusting the transversal position of the main spot with respect to the track to be scanned, and an electronic circuit for processing output signals of the detectors to derive a position signal which represents the position of the adjusting element. The position signal can be derived in a simple manner from the detector signals which are generated by the shift of the radiation spots on the detectors. As a result it is no longer necessary to mount a separate position sensor proximate to the adjusting element. This element may be, for example, the above-mentioned objective lens or a rotatable mirror. The position of the element can be corrected in known manner by means of the position signal so that the beams pass through the objective lens as centrally as possible. During a searching action the position signal may control, for example, the fine control so as to keep the objective lens at a nominal position in the scanning head, the lens being used on its optical axis. During tracking, the position signal can control the coarse control so as to position the scanning head in such a way that the objective lens can approximately stay in its nominal position for focusing the beams on the track to be followed.

It is to be noted that it is proposed in the Abstract of Japanese Patent Application No. 62-126808 to derive the position of an objective lens in a scanning head from a tracking error signal which is generated by a single scanning beam. When the scanning head traverses the tracks transversely during a searching action, the tracking error signal will have a sinusoidal variation. The DC component of the tracking error signal is a measure of the position of the objective lens. A drawback of this known device is that it is slow because the AC component must be filtered out of the tracking error signal. The changes of position of the objective lens may, however, be fast, particularly at the start of a searching action when the speed of the scanning head is considerably increased. Then the circuit will not supply a correct position signal.

A particularly advantageous embodiment of the device is characterized in that the electronic circuit is adapted to supply a position signal which is proportional to the sum of two difference signals of the tracking beam detection systems a and b and a constant multiplied by a difference signal of the main beam detection system c. This novel and inventive combination of detector signals yields a position signal which has the important advantage that it is only slightly influenced by movements of the spots transversely to the track direction.

A further embodiment of the device is characterized in that the constant aforesaid is equal to 2T, in which T is the intensity ratio between a tracking beam and the main beam. This choice of the constant provides the important advantage that the intensity difference between the main beam and the tracking beams is compensated for.

The two tracking beams may not have the same intensity due to a nonsymmetrical intensity distribution of the beam from the radiation source or due to an asymmetry in the optical components between the radiation source and the detectors. A further embodiment of the device which is adapted to compensate for that is characterized in that the difference signal of one of the detection systems a and b is corrected for an intensity difference between the two tracking beams. By multiplying the difference signal of detection system a or b by the intensity ratio of the two tracking beams, a correct position signal can be generated.

A preferred embodiment of the device is characterized in that the distance between the two tracking spots in a direction perpendicular to the track to be scanned is equal to half a track period. The position signal supplied by the electronic circuit is then no longer influenced by movements of the spots transversely to the track direction.

It is to be noted that such a distance between the tracking spots is known from said European Patent Application. However, in such Application this distance is only utilized to obtain a maximum amplitude of the tracking error signal.

A further embodiment of the device according to the invention is characterized by a further electronic circuit which is connected to the outputs of the detectors and supplies a normalizing signal proportional to the sum signals of the detection systems a and b and 2T times the sum signal of the detection system c, and a normalizing circuit which is connected to the outputs of the two electronic circuits for supplying a normalized position signal. Due to the normalization the position signal will be independent of the intensity of the radiation source. Changes in this intensity will then no longer lead to a change of the amplification in the control loop for controlling the position of the adjusting element.

BRIEF DESCRIPTION OF DRAWINGS

The invention will now be described in greater detail by way of example with reference to the accompanying drawings in which.

Identical reference numerals in the various Figures refer to the same components.

DESCRIPTION OF PREFERRED EMBODIMENTS

Figure 1:
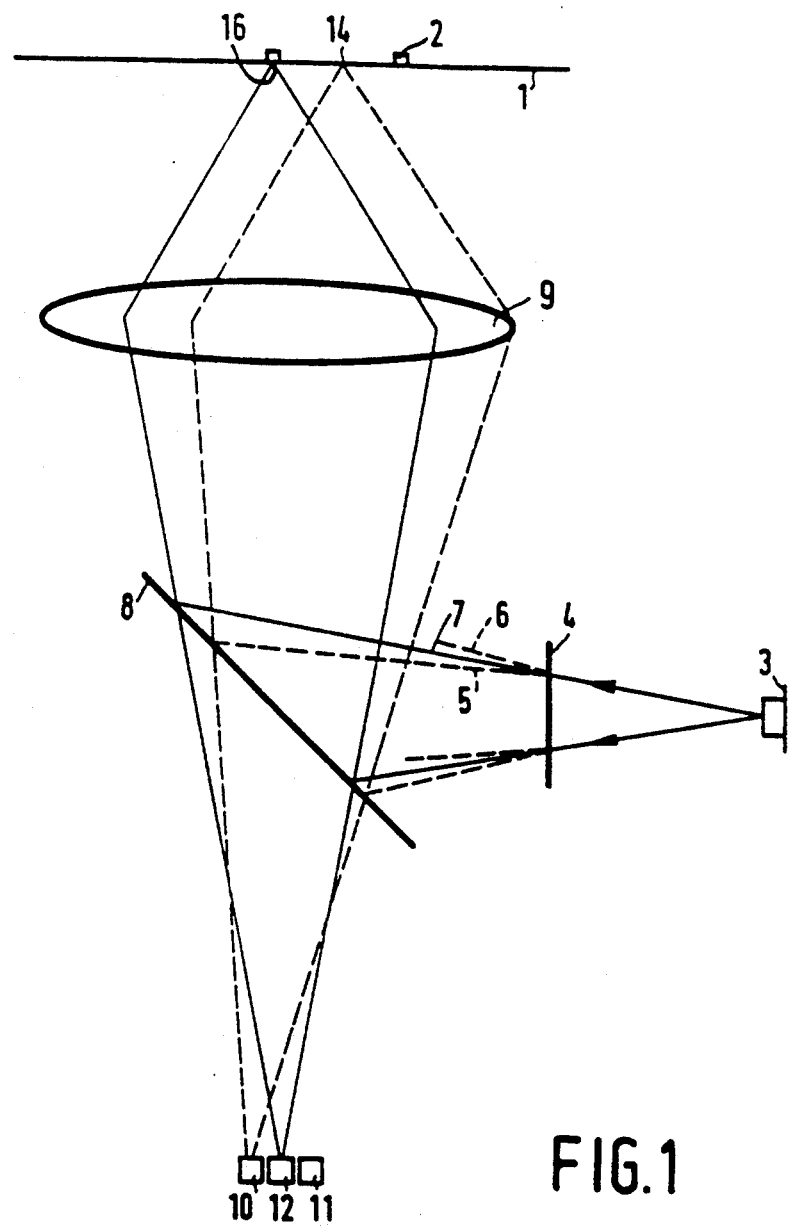
FIG. 1 shows a scanning head scanning a record carrier by means of three beams.
Figure 2:
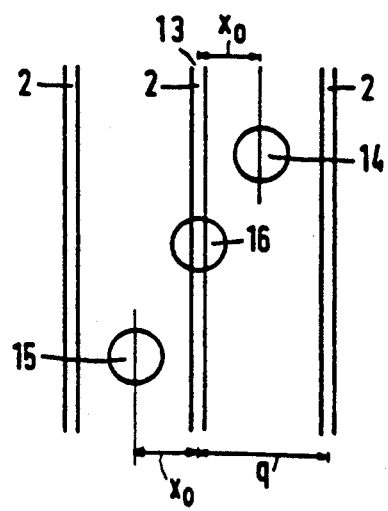
FIG. 2 shows the positions of the spots formed by the three beams on the record carrier.
Figure 3:
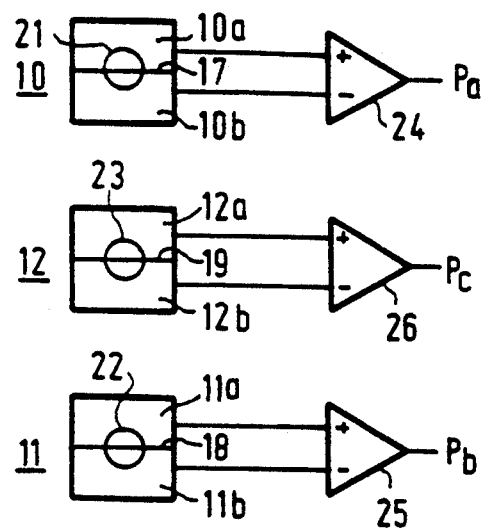
FIG. 3 shows the three detection systems of the scanning head with electronic processing circuitry.

FIG. 1 shows in cross-section a part of an information plane 1 of a record carrier which is scanned by means of an optical head. The information plane has parallel tracks 2 or quasi-parallel tracks jointly forming a spiral track perpendicular to the plane of the drawing. The information may be stored as optically readable areas (not shown in the Figure) between or in the tracks. The optical head comprises a radiation source 3, for example, a diode laser whose radiation is incident on a diffraction grating 4. The grating splits the incoming beam into a +1, −1 and 0-order beam, i.e. a first tracking beam 5, a second tracking beam 6 and a main beam 7. For the sake of clarity the full paths of only the first tracking beam and the main beam are shown. A beam splitter 8, for example a partially transparent mirror, sends the beams towards an objective lens 9 which focuses the beams on the information plane 1. The positions of the spots formed on the information plane are shown in FIG. 2. The tracks 2 have a mutual distance or period q. Track 13 is the track to be followed by the scanning head. The first and second tracking beams form a tracking spot 14 and a tracking spot 15, respectively, both at a nominal distance $x_0$ from the centre of track 13. The main spot 16 formed by the main beam is located on track 13. As is shown in FIG. 1, the radiation reflected by the information plane is passed towards three detection systems 10, 11, 12 via the objective lens 9 and the beam splitter 8. Detection system 10 receives radiation from the first tracking beam 5, detection system 11 receives radiation from the second tracking beam 6 and detection system 12 receives radiation from the main beam. FIG. 3 shows the three detection systems in a plan view. The detection systems 10, 11 and 12 are divided into two halves each by separating lines 17, 18 and 19, respectively, each half forming a detector. These detectors are denoted by the reference numerals 10a, 10b and 11a, 11b and 12a, 12b in the Figure. The separating lines extend parallel to the tracks 2 in the information plane 1.

The spots formed by the three beams on the detectors are denoted by the reference numerals 21, 22 and 23 in FIG. 3. The information in the three beams is read in accordance with the push-pull method. This means that the output signals of the detectors 10a and 10b are applied to a differential amplifier 24 for forming the push-pull signal Pa. Similarly, differential amplifiers 25 and 26 form the push-pull signals Pb and Pc of detection systems 11 and 12, respectively.

Figure 4:
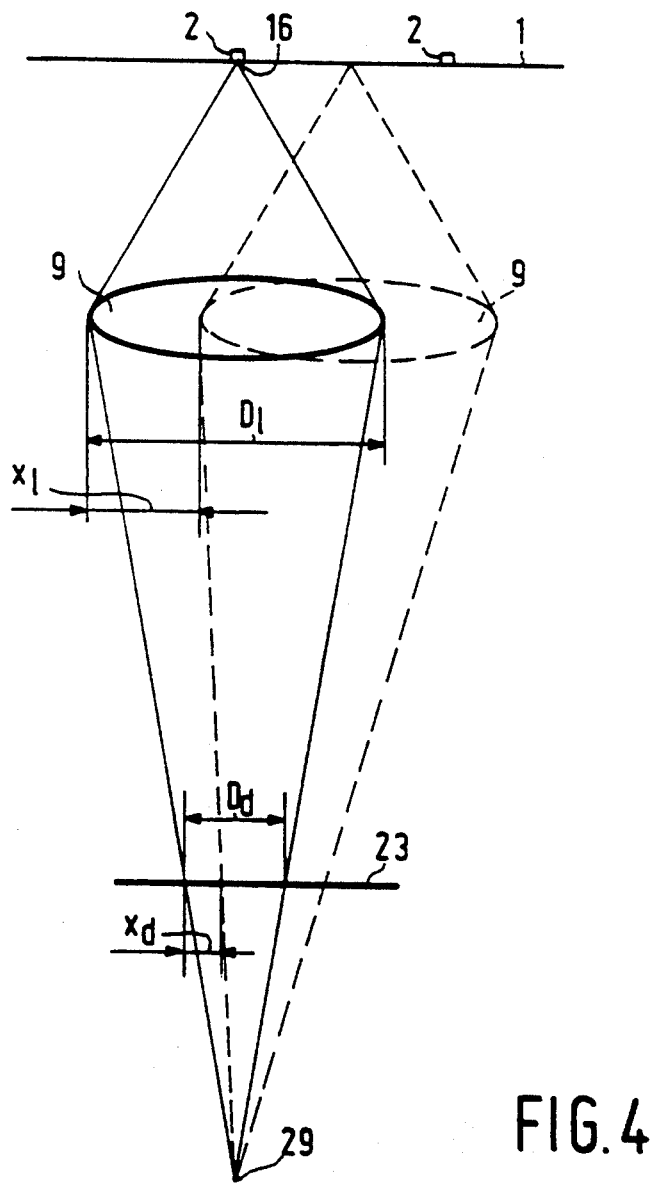
FIG. 4 shows a scanning head with a lens in a nominal position and in a shifted position.

The three push-pull signals formed in this way may be beset with two different types of offset errors. The first offset error, the symmetrical offset, is produced when the three spots 21, 22 and 23 are offset with respect to the three detection systems 10, 11 and 12 in a direction perpendicular to the separating line 17. Such an offset occurs when the lens 9 is shifted sideward, i.e. transversely to the tracks, as is shown in FIG. 4. In this Figure the solid lines show the lens 9 in the nominal position and the associated path of radiation of one of the beams 5, 6 or 7, and the broken lines show the lens 9 shifted over a distance $x_1$ and the associated radiation path of the same beam. During the offset the position of the image 29 of the radiation source 3 remains unchanged. The main spot 16 on the information plane 1 moves sideways or transversally across the tracks 2 over a distance which is proportional to $x_1$. A controlled shift of the lens 9 is therefore often used as a fine control for the transversal tracking of the main spot 16, while the coarse control consists of shifting the entire optical head in the transversal direction. It is clear from the Figure that the spot 23 is displaced across the detector plane by shifting the lens 9. The displacement $x_d$ of the spot is defined by $$x_d/D_d = x_1/D_1, \qquad (1)$$

wherein $D_d$ and $D_1$ are the diameters of the main beam at the location of the detection system 12 and the lens 9, respectively. The positions of the spots 21 and 22 are coupled to the position of the spot 23, so that in the case of a displacement of spot 23 with respect to the detection system 12 over a distance $x_d$ the spots 21 and 22 are also displaced over the same distance with respect to their detection systems 10 and 11. The result is that the difference signals Pa, Pb and Pc each have an offset $\epsilon_s$ proportional to $x_d$.

A second offset error with which the three push-pull signals may be beset is the asymmetrical offset. This offset occurs when the distance between the separating lines 17 and 18 of the detection systems 10 and 11 is not equal to the distance between the centres of the spots 21 and 22 of the tracking beams. This causes the same offset $\epsilon_s$, though opposite in sign, of the push-pull signals Pa and Pb. By definition, the asymmetrical offset is zero in the push-pull signal Pc. The asymmetrical offset may be caused by, for example, a temperature variation of the diode laser 3, which results in a variation of the wavelength of the emitted radiation. This changes the angle at which the grating 4 deflects the tracking beams 5 and 6 and hence the position of the spots 21 and 22 formed by the tracking beams on the detection systems 10 and 11.

It can be derived in a simple manner that the following expressions hold for the three push-pull signals:

$$Pa = c\ Ia[m\ \sin(2\pi x/q + \phi) + \epsilon_s + \epsilon_a] \quad (2)$$

$$Pb = c\ Ib[m\ \sin(2\pi x/q - \phi) + \epsilon_s - \epsilon_a] \quad (3)$$

$$Pc = c\ Ic[m\ \sin(2\pi x/q) + \epsilon_s] \quad (4)$$

with $$\phi = 2\pi x_0/q. \quad (5)$$

In this expression c is a detector-dependent constant which is determined by the efficiency of the conversion of radiation intensity into electric signal, Ii is the intensity in beam i at the location of the detection system, m is the modulation amplitude in the case of a transversal displacement of the scanning head across the tracks and dependent on the geometry of the tracks, x is a tracking error or the transversal displacement of the spots 14, 15 and 16 when the main spot 16 does not exactly follow the track 13. The intensity Ii is principally determined by the intensity of the radiation from the laser 3, the intensity distribution across the beams realised by the grating 4 and the reflection of the information plane 1. Ia and Ib will be approximately equal. It is known from the above-referenced European Patent Application No. 0,201,603 that the operation $$Er = 2T\ Pc - (Pa + Pb) \quad (6)$$

with $$T = Ia/Ic \quad (7)$$

leads to a signal Er representing the tracking error x, in which the offset terms $\epsilon_s$ and $\epsilon_a$ no longer occur. It has been assumed that Ia and Ib are equal. A maximum sensitivity of Er for x is obtained if $\phi = \pi$, in other words, if the transversal distance $X_0$ between each of the tracking spots 14 and 15 and main spot 16 is half a track period so that the tracking spots are centered right between the tracks. Small variations in $\phi$ due to, for example, eccentricity of the track structure with respect to the axis of rotation of a round record carrier than hardly influence the signal Er. The signal Er can be used as a tracking error signal in a tracking servosystem so as to keep the main spot 16 on the desired track 13.

If an offset of the objective lens 9 is used for the fine control of the tracking, the lens may be situated far away from the optical axis of the system. This may also occur at the start or the end of a searching action when the scanning head speed is increased considerably. To correct these large offsets, a position signal is required which represents the position of the objective lens in the scanning head. To this end the offset $\epsilon_s$ is determined in the device according to the invention, which offset is a measure of the displacement of the objective lens. The following operation of the push-pull signals leads to a signal Ep which is proportional to $\epsilon_s$:

$$\begin{aligned} Ep &= 2TPc + (Pa + Pb) \\ &= 2cIa[m(1 + \cos\phi)\sin(2\pi x/q) + 2\ \epsilon_s] \end{aligned} \quad (8)$$

The modulation m is generally small with respect to $\epsilon_s$ so that the signal Ep can generally be used as a measure of the position of the objective lens 9. If m is large, a measure of the position of the objective lens can be obtained by determining the DC component of the signal Ep by means of a circuit. This is analogous to the method known from said Abstract of Japanese Patent Application no. 63-291224, for deriving from a tracking error signal a signal representing the position of the objective lens but the method works better for the position signal Ep according to the invention than for a tracking error signal because the modulation of the position signal by the tracking error x is smaller than that of the tracking error signal. The method is simplified if $\phi$ is chosen to be $\pi$, i.e. if the centres of the tracking spots 14 and 15 are right between two consecutive tracks. In that case the dependence on x is altogether eliminated, obtaining $$Ep = 4\ c\ Ia\ \epsilon_s. \quad (9)$$

This signal is proportional to the symmetrical offset $\epsilon_s$ in the detector signals, hence proportional to the displacement $x_d$ of the spots on the detection systems, and via formula (1) it is proportional to the displacement $x_1$ of the objective lens 9 of the scanning head. Due to said choice of $\phi$ the signal is free from modulation by the tracks 2 in the information plane, i.e. when the scanning head is displaced transversely across the tracks, the signal Ep does not vary due to the tracks. Ep can be used as a position error signal for a servosystem for correcting the position of the objective lens 9.

The intensity in the two tracking beams 5 and 6 may be different. This may occur when, for example, the tracking beams are generated from the border rays of the beam from the laser 3, as described in published Netherlands Patent Application no. 9002007. If the intensity distribution in the beam is asymmetrical, the border rays will not be equally intensive and the tracking beams 5 and 6 will thus have a different intensity. Consequently, the signal Ep, given by formula (9) will still be dependent on x, i.e. the signal will exhibit modulation by the tracks. Then it is less well usable as a position signal for the objective lens. A satisfactory position signal can be obtained in this case by multiplying the push-pull signal Pb by a correction factor b, in which b is equal to the ratio between the intensity in spots 21 and 22 on the detection systems 10 and 11, respectively. The new formula for forming the position signal Ep then is:

$$Ep32\ 2T\ Pc + Pa + b\ Pb \quad (10)$$

with $$b = Ia/Ib \quad (11)$$

Instead of multiplying Pb by b, Pa can of course also be multiplied by 1/b.

The value of the position signal Ep in formula (9) is dependent on the intensity Ia incident on the detection system. This intensity depends, inter alia, on the quantity of radiation emitted by the laser 3 and on the reflection of the information plane 1. For example, if the laser supplies ten times more power during writing than during reading of information in the information plane, the position signal will also be ten times stronger during writing than during reading, independent of the position of the objective lens 9. This is an unwanted situation for a control loop. It is therefore desirable to make the position signal independent of the beam intensity on the detection systems. According to a further aspect of the invention, this can be realised by normalizing the position signal by means of a normalizing signal which is derived from the signals of the detection systems 10, 11 and 12. Instead of determining difference signals of each detection system, as in the foregoing, sum signals are now derived from each detection system, each of which represents the total intensity incident on a detection system. These sum signals for the detection systems 10, 11 and 12, respectively, are:

$$Sa = c\, Ia[d + n \cos(2\pi x/q + \phi)] \quad (12)$$

$$Sb = c\, Ib[d + n \cos(2\pi x/q - \phi)] \quad (13)$$

$$Sc = c\, Ic[d + n \cos(2\pi x/q)]. \quad (14)$$

In these expressions d is a constant which is approximately equal to 1, and n is a modulation amplitude which is dependent on the geometry of the tracks, comparable to the modulation amplitude m in the formulas (2), (3) and (4). The normalizing signal Sn is now formed by:

$$\begin{aligned} Sn &= -2T\cos\phi\, Sc + Sa + bSb \\ &= 2cdIa(1 - \cos\phi) \end{aligned} \quad (15)$$

For the choice $\phi = \pi$ used above the normalizing signal will become $$\begin{aligned} Sn &= 2TSc + Sa + bSc \\ &= 4cdIa. \end{aligned} \quad (16)$$

This signal is free from modulation by the tracks 2 because the variable x no longer occurs in it. Using formulas (9) and (16), the normalized position signal Ep' now is $$\begin{aligned} Ep' &= Ep/Sn \\ &= \epsilon_s/d. \end{aligned} \quad (17)$$

The normalized position signal is now independent of the beam intensity of the laser 3, the reflection of the information plane 1 and the position of the scanning head with respect to the tracks 2.

Figure 5:
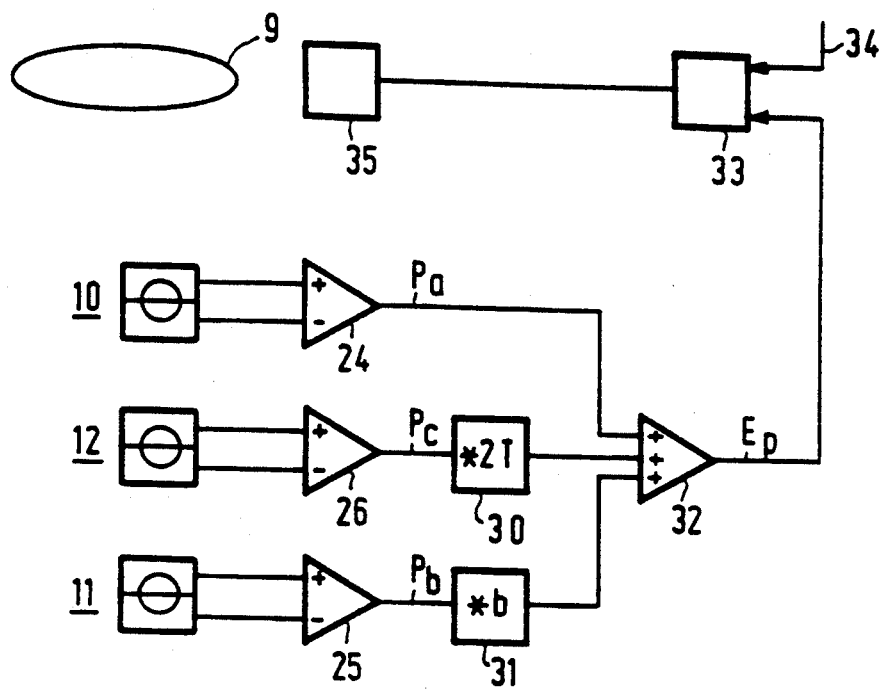
FIG. 5 shows a scanning head with the circuit generating the position signal and the position control for the objective lens.

An embodiment of an electronic circuit for generating a position signal of the objective lens 9 in accordance with formula (10) is shown in FIG. 5. The three push-pull signals Pa, Pb and Pc are derived in the same way from the signals of the detection systems 10, 11 and 12 as in FIG. 3. The signal Pc is multiplied by the constant factor 2T by means of a multiplier circuit 30 (see formula (6) and (7)). If the intensities in the spots 21 and 22 of the tracking beams 5 and 6 are not equal, the signal Pb must be multiplied by the constant b (see formula (11)) in a multiplier circuit 31. The circuits 30 and 31 may be integrated with the differential amplifiers 26 and 25, respectively. The output signals of the differential amplifier 24 and of the circuits 30 and 31 are added in a summing amplifier 32. The output signal of the summing amplifier is the position signal Ep. The position signal can be used as an input for a control circuit 33 which corrects the transversal position of the objective lens 9, i.e. in a direction perpendicular to the tracks as well as to the optical axis of the objective lens 9. The control circuit may have an additional input 34 for the tracking error signal Er. An actuator 35 displaces the objective lens in conformity with the output signal of the control circuit 33. During a searching action of the scanning device the position signal Ep is used to keep the objective lens in its position. During tracking, the signal Er is used to control the position of the objective lens as a fine control of the transversal tracking of the main spot 16. The signal Ep is then used for the coarse control which determines the position of the slide incorporating the scanning head with respect to the tracks. When the main spot 16 is held on a given track, the position of the objective lens in the scanning head can be corrected by controlling the position of the slide.

Figure 6:
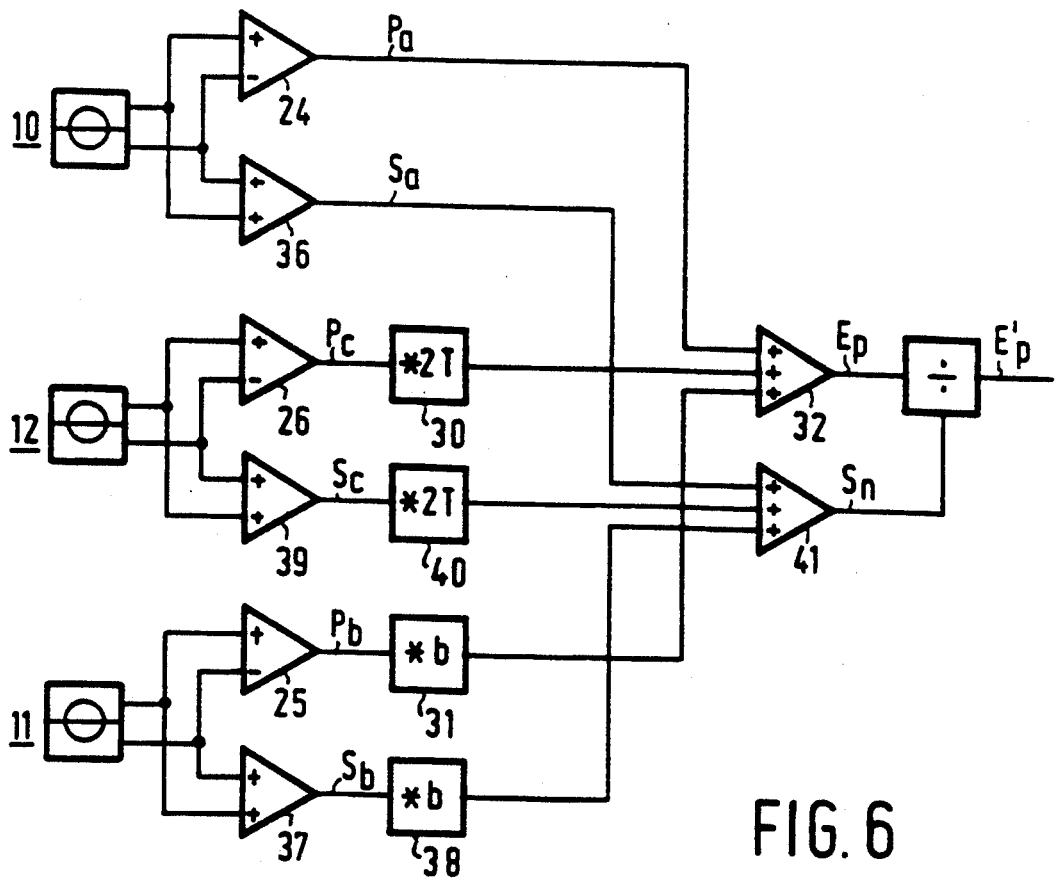
FIG. 6 shows this scanning head provided with a normalizing circuit for the position signal.

An electronic circuit for generating a position signal for the objective lens 9 normalized in accordance with formula (17) is shown in FIG. 6. The nonnormalized position signal Ep is formed in the same way as in FIG. 5. A summing amplifier 36 produces the sum signal Sa which is proportional to the total intensity incident on the detection system 10. Similarly, summing amplifiers 37 and 39 produce the sum signals Sb and Sc. If the intensities incident on the detection systems 10 and 11 are not equal, Sb must be multiplied by the constant b (see formula (11)) in a circuit 38. The sum signal Sc is multiplied by the constant factor 2T (see formula (7)) by means of a circuit 40. A summing amplifier 41 subsequently adds the outputs of the summing amplifier 36 and the two circuits 38 and 40. The output of the summing amplifier 41 is the normalizing signal Sn. Finally, a divider circuit 42 divides the position signal Ep by the normalizing signal Sn so as to obtain the normalized position signal Ep'. Similarly as in FIG. 5, the last-mentioned signal may be applied to a control circuit 33 for positioning the objective lens 9.

The detection system 12 may be divided into four quadrants for use with a main beam which is made astigmatic for generating a focus error signal as described in U.S. Pat. No. 4,023,033. There are still other methods of generating the focus error signal, which methods require a different division of the detection system 12. All methods can be used in the device according to the invention as long as a push-pull signal analogous to Pc can be derived from the detection system 12.

In the embodiments described the fine control of the transversal position of the main spot is effected by displacing the objective lens, and the position signal is used for determining the position of this lens. However, the transversal position of the main spot can also be controlled by means of other elements. An example is the mirror 8 in FIG. 1 since the main spot 16 can also be displaced by tilting this mirror. The position signal will then be a measure of the tilt of the mirror, with which signal a control circuit for the mirror can be controlled. The described electronic circuit for generating the position signal is only one out of many possible circuits performing the same function.

I claim:

1. Apparatus for optically scanning successive tracks in an information plane of a record carrier, comprising:

an optical system for generating a main scanning beam and a pair of tracking beams;

a lens system for focusing the three beams on the information plane to form a scanning spot on a track to be scanned and two tracking spots located at both sides of said track; and at least three detection systems a, b and c for respectively receiving radiation from the information plane produced by the two tracking beams and the main beam, each detection system including at least two detectors;

characterized in that said apparatus further comprises:

adjusting means which is adjustable in position in order to produce corresponding adjustment of the positions of said spots transversely with respect to the track to be scanned; and an electronic circuit for deriving difference signals $P_a$, $P_b$, $P_c$ respectively corresponding to the difference between output signals produced by the detectors of the respective detection system a, b and c, and forming a position signal $E_p$ proportional to the sum of $P_a$, $P_b$ and $KP_c$, where K is a constant;

said position signal $E_p$ being representative of the position of said adjusting means.

2. Apparatus as claimed in claim 1, characterized in that the constant K is equal to 2T, where T is the intensity ratio between a tracking beam and the main beam.

3. Apparatus as claimed in claim 1, characterized in that the difference signal of one of the detection systems a and b is corrected for any intensity difference between the two tracking beams.

4. Apparatus as claimed in claim 1, characterized in that the transverse spacing between successive tracks in said information plane is a track pitch distance q, the transverse spacing between the main spot and each of the two tracking spots is a distance $x_o$, and $x_o = q/2$.

5. Apparatus as claimed in claim 2, characterized in that said apparatus further comprises:

a further electronic circuit for deriving sum signals $S_a$, $S_b$, $S_c$ respectively corresponding to the sum of the output signals produced by the detectors of the respective detection systems a, b and c, and forming a normalizing signal $S_n$ proportional to the sum of $S_a$, $S_b$ and $2TS_c$; and a normalizing circuit connected to the outputs of the two electronic circuits for dividing the position signal $E_p$ by the normalizing signal $S_n$ so as to thereby derive a normalized position signal $E'_p$, said normalized position signal $E'p$ being independent of the intensity of the radiation received by the detection systems a, b and c.

6. Apparatus as claimed in claim 5, characterized in that the sum signal of one of the detection systems a and b is corrected for any intensity difference between the two tracking beams.

7. Apparatus for optically scanning successive tracks in an information plane of a record carrier, comprising:

an optical system for generating a main scanning beam and a pair of tracking beams;

a lens system for focusing the three beams on the information plane to form a scanning spot on a track to be scanned and two tracking spots located at both sides of said track; and at least three detection systems a, b and c for respectively receiving radiation from the information plane produced by the two tracking beams and the main beam, each detection system including at least two detectors;

characterized in that said apparatus further comprises:

adjusting means which is adjustable in position in order to produce corresponding adjustment of the positions of said spots transversely with respect to the track to be scanned; and an electronic circuit for processing output signals produced by the detectors of the respective detection system a, b and c so as to form therefrom a position signal $E_p$ which is representative of the position of said adjusting means.

8. Apparatus as claimed in claim 7, characterized in that the transverse spacing between successive tracks in said information plane is a track pitch distance q, the transverse spacing between the main spot and each of the two tracking spots is a distance $x_o$, and $x_o = q/2$.

* * * * *